Jan. 1, 1929.
H. W. ROBBINS
1,697,735
CUSHION VEHICLE WHEEL
Filed March 15, 1928
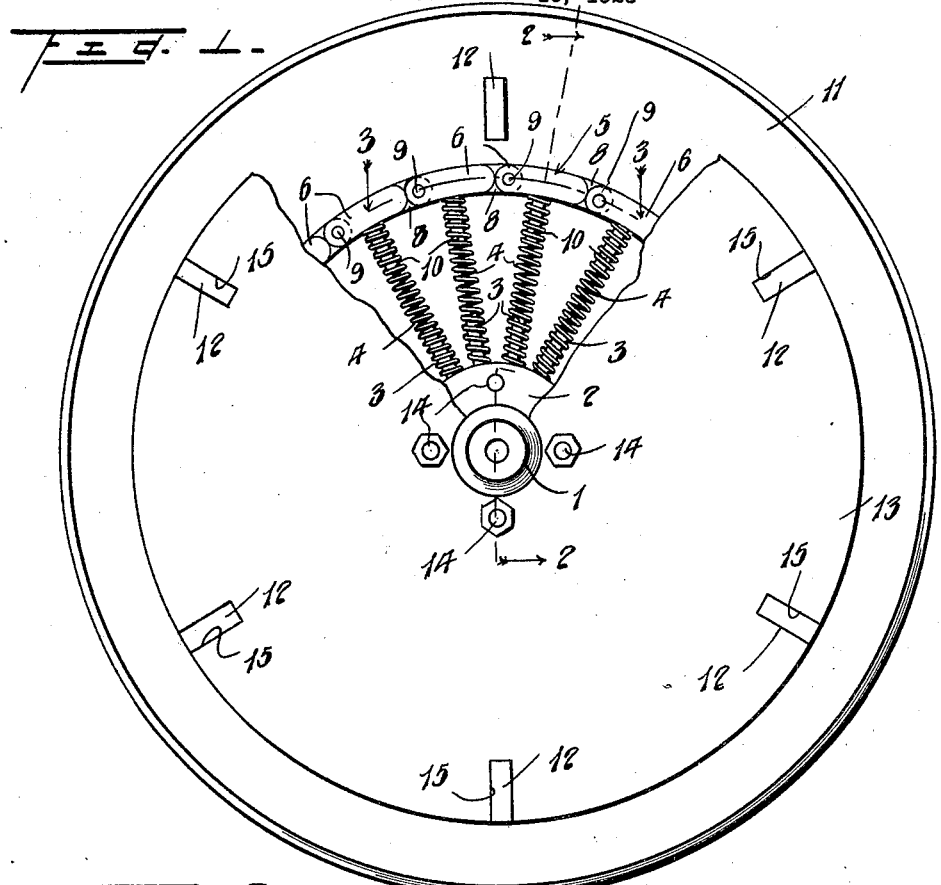
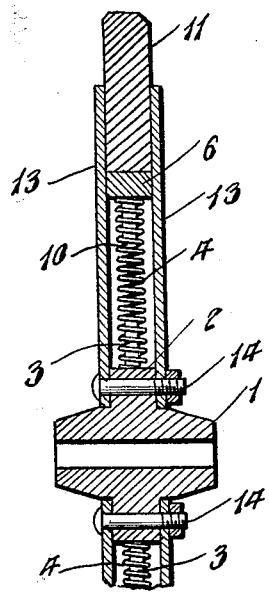
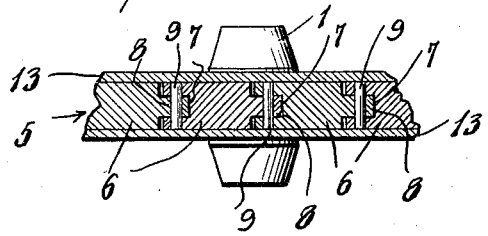
Inventor
H. W. Robbins,
By
Attorney Patented Jan. 1, 1929.

1,697,735

UNITED STATES PATENT OFFICE.

HENRY W. ROBBINS, OF HARLINGEN, TEXAS.

CUSHION VEHICLE WHEEL.

Application filed March 15, 1928. Serial No. 261,844.

The invention relates to vehicle wheels and particularly to wheels for automobiles, trucks, and the like, and has for its object the provision of a wheel that is cushioned to counteract shocks in operation over the road and that obviates the disadvantages of the use of pneumatic tires for vehicle wheels.

To this end the invention comprises a wheel consisting of a hub having outwardly projecting radial pins or studs and a rim formed of a plurality of links pivotally connected together, each of the links having an inwardly extending pin or stud and helical springs engaged by said pins or studs and forming the cushions for the wheel. Outside of the articulated rim of links pivotally secured together, as heretofore stated, a tread ring formed of rubber is provided and having lateral projections on the two sides, and secured over the wheel on each side, to the hub, are circular disks or plates forming covers for the cushion means, and having recesses to receive the lugs on the tread ring.

The invention will be described in detail hereinafter and will be found illustrated in the accompanying drawings, in which Figure 1 is a side view of the improved wheel partly broken away to show the interior, Figure 2 is a transverse sectional view on a plane indicated by the line 2—2 of Figure 1, and Figure 3 is a sectional detail on the line 3—3 of Figure 1.

The improved cushion wheel comprises a hub 1 that may be of any type, but provided with a circumferential flange 2. Extending radially from the flange 2 are pins or studs 3 that receive one end of helical springs 4. A rim 5 is provided and composed of a plurality of links 6 that are pivotally connected together, each link 6 having a recess 7 to receive a projection 8 on the adjacent link, a pivot pin 9 being secured through the overlapping parts of the link. Each link 6 is provided with an inwardly extending pin or stud 10 to receive the outer ends of springs 4. A tread ring 11 snugly fits the rim 5, and is preferably made of cushion material, such for instance as rubber, and is provided with a plurality of lugs or projections 12 extending laterally from two sides of the ring. 13 indicates disks or plates forming the sides of the wheel and secured to the hub flange 2 in any suitable manner, such for instance as by means of bolts 14 engaging through the plates and hub flange. 15 indicate elongated recesses in the disks or plates 13 to receive the lugs or projections 12 to insure rotation of the tread ring 11 with the hub axle.

It will be understood that the wheels may be provided with any suitable brake drum and braking apparatus, such structures not being a part of the invention.

What is claimed is:—

1. In a spring wheel, a hub, radially disposed pins extending from the hub, a rim formed of a plurality of links pivotally connected together, pins on said links and extending inwardly of the rim, and spring means engaging oppositely disposed pins.

2. A spring wheel, comprising a hub, radially disposed pins extending from the hub, a rim formed of a plurality of links pivotally connected together, pins on said links and extending inwardly of the rim, spring means engaging oppositely disposed pins, a tread ring engaging said rim, and plates secured to the hub and forming the sides of the wheel.

In testimony whereof I affix my signature.

HENRY W. ROBBINS.